United States Patent Office 3,467,675
Patented Sept. 16, 1969

3,467,675
ANTIDEPRESSANT BASIC DERIVATIVES OF PHTHALANES, ISO-CHROMANES AND ISO-CHROMENES
Povl Viggo Petersen, Virum, Niels Lassen, Gentofte, Jette Nørgaard, Copenhagen, and Torben Huld, Lyngby, Denmark, assignors to Kefalas A/S, Copenhagen-Valby, Denmark
No Drawing. Filed Mar. 3, 1966, Ser. No. 540,438
Claims priority, application Great Britain, Mar. 19, 1965, 11,855/65
Int. Cl. C07d 5/40, 7/40
U.S. Cl. 260—346.2                    23 Claims

ABSTRACT OF THE DISCLOSURE

Aminoalkylene derivatives of phthalanes, iso-chromanes, and iso-chromenes, useful as antidepressants.

---

The present invention relates to novel compounds of the following general formula:

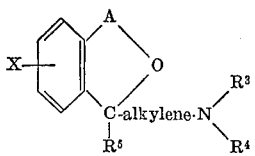

I wherein A represents one of the groups

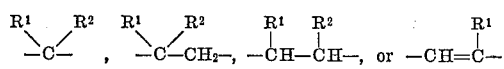

$R^1$ and $R^2$ each represents hydrogen or a lower-alkyl group, $R^3$ and $R^4$ each represents hydrogen, or a lower-alkyl group, provided that $R^3$ and $R^4$ may not both represent hydrogen, or $R^3$ and $R^4$ taken together with the nitrogen atom represent the radical of a heterocyclic amine having a saturated five-membered or six-membered ring. $R^5$ represents hydrogen, a cyclohexyl group, a phenyl group, or a thienyl group, possibly substituted with a halogen group, a lower-alkyl group, a lower-alkyloxy group or a trihalomethyl group, "alkylene" represents an alkylene chain, straight or branched, having from 2–6 carbon atoms, at least two carbon atoms being in the chain directly connecting the ring carbon atom with the nitrogen atom, and X represents hydrogen, halogen, a lower-alkyl group, a lower-alkyloxy group or a trihalomethyl group, as well as the acid addition salts thereof with pharmaceutically acceptable acids.

It is an object of the present invention to provide novel compounds of Formula I, a method of making the same, a method for the alleviation, palliation, mitigation, or inhibition of the manifestations of certain physiological-psychological abnormalities of animals therewith, and pharmaceutical compositions comprising such novel compounds as active ingredient. Other objects will be apparent to one skilled in the art and still other objects will become apparent hereinafter.

The compounds of Formula I and the acid addition salts thereof are useful therapeutics and possess valuable pharmacodynamic properties. In animal experiments the compounds show a very pronounced potentiating effect on adrenaline and nor-adrenaline and also a very strong antireserpine effect. They moreover have relatively weak sedative and anticholinergic effetcs. These effects as compared with a relatively low toxicity make the compounds of Formula I as well as their acid addition salts very useful in treatment within the psychotherapy especially of endogenic depressions.

The compounds of Formula I and the non-toxic acid addition salts thereof may be administered both orally and parenterally, for example in the form of tablets, capsules, powders, syrups or solutions for injection.

The invention moreover relates to a method for the preparation of compounds of Formula I, whereby a compound of the following formula:

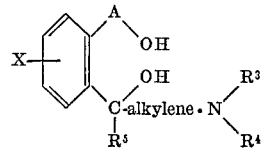

II wherein A represents

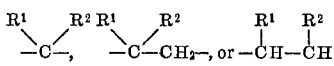

$R^1$, $R^2$, $R^5$ and X are as defined above and $R^3$ and $R^4$ each represents a lower-alkyl group or taken together with the nitrogen atom represent the radical of a five-membered or six-membered heterocyclic ring, and "alkylene" is an alkylene chain with three carbon atoms in the chain directly connecting the ring carbon atom with the nitrogen atom, is reacted with a dehydrating agent, and is isolated as the free amine or as a non-toxic acid addition salt in conventional manner, and in the case when $R^3$ and $R^4$ each represents a lower-alkyl group, if desired, reacting the compound of Formula I with a chloroformic acid ester of the formula Cl.COOR$^6$, wherein $R^6$ represents a lower-alkyl group or a benzyl group, hydrolysing the resulting compound of the formula:

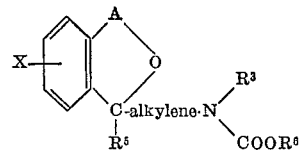

and isolating the compound of Formula I, where $R^3$ is a lower-alkyl group and $R^4$ is hydrogen as the free amine or in the form of a non-toxic acid addition salt.

The dehydration according to the invention may be effected by means of agents ordinarily used for dehydration purposes, e.g., concentrated hydrochloric acid, possibly mixed with glacial acetic acid, a phosphoric acid, a hydrogen halide, e.g. hydrogen chloride, in an inert organic solvent such as chloroform, benzene, toluene or the like. It is preferable to use weak to moderately strong acidic dehydrating agents and avoid very strong dehydrating agents such as concentrated sulphuric acid, as otherwise the dehydration of the compounds of Formula II may lead to undesired derivatives as described in British Patent No. 939,856.

The acid addition salts of the novel compounds of Formula I are preferably salts of pharmacologically acceptable non-toxic acids such as mineral acids, for example, hydrochloric acid, hydrobromic acid, phosphoric acid, sulphuric acid, and the like, and organic acids such as acetic acid, tartaric acid, maleic acid, citric acid, methane sulphuric acid and the like.

In the foregoing Formula I and elsewhere herein, the terms lower-alkyl and lower-alkyloxy refer to alkyl or alkyloxy radicals containing up to and including eight carbon atoms, and preferably no more than three carbon atoms, which radicals may have either straight or branched-chain structure, for example methyl, ethyl, propyl, isopropyl, butyl, isobutyl, amyl, hexyl, heptyl, octyl, methoxy, ethoxy, propoxy, butoxy, amyloxy, hexoxy, heptoxy, or the like.

As representative examples of radicals in which $R^3$ and $R^4$ together with the nitrogen atom in Formula I represent the radical of a heterocyclic amine having a saturated five-membered or six-membered ring may be mentioned the pyrrolidine, piperidine, morpholine, thiamorpholine, N'-lower-alkyl-piperazine, e.g. N'-methylpiperazine, N'-lower-hydroxyalkyl-piperazine, piperazine, or such radicals containing from one to four or even more C-lower-alkyl, e.g. C-methyl, substituents e.g. tetramethylpyrrolidine, and like radicals.

The starting dihydroxy compounds of Formula II may, when $R^1$ and $R^2$ both represent lower-alkyl groups, conveniently be prepared by reacting a compound of the following formula:

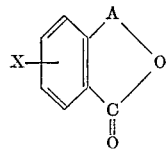

III wherein A represents

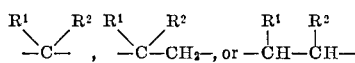

and X is as defined above, with a magnesium halide of the general formula:

$$R^5MgHal$$

wherein $R^5$ is as defined above, provided that it may not be hydrogen, and hydrolysing the reaction mixture with an acid solution, isolating the resulting compound of the general formula:

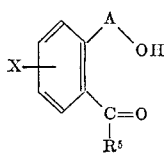

IV and reacting this compound with a compound of the general formula:

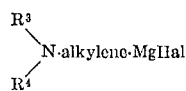

V wherein $R^3$ and $R^4$ represent alkyl groups or together with the nitrogen atom form a saturated five- or six-membered ring and "alkylene" is an alkylene chain with 3 C atoms in the chain directly connecting the ring carbon atom with the nitrogen atom in an inert medium such as diethylether or tetrahydrofuran and isolating the resulting dihydroxy compound of Formula II.

When $R^5$ is hydrogen the starting dihydroxy compounds of Formula II may conveniently be prepared by reacting the compound of Formula III with the Grignard compound of Formula V, isolating the resulting compound of the general formula:

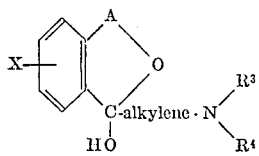

and reducing this carbinol with lithium aluminum hydride and isolating the dihydroxy compound of Formula II.

The starting dihydroxy compounds of Formula II are preferably such compounds wherein X is hydrogen, $R^1$ and $R^2$ are most preferably methyl groups or hydrogen, $R^3$ and $R^4$ are hydrogen or methyl groups, and $R^5$ is a phenyl group, not only from the standpoint of pharmacological importance and availability of these starting materials, but also from the standpoint of ease of operation and smoothness of reaction.

The novel compounds of Formula I may also be prepared by reducing the compound of the general Formula IV to the corresponding carbinol of the general formula:

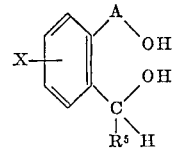

in well-known manner for example by reduction with lithium aluminum hydride (LiAlH$_4$), dehydrating said carbinol with for example concentrated hydrochloric acid, dry hydrogen chloride in chloroform, or the like, and reacting the resulting compound of the general formula:

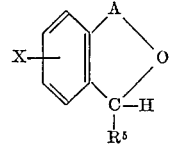

with a compound of the formula

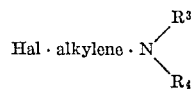

wherein $R^3$ and $R^4$ each represent hydrogen or a lower-alkyl group or $R^3$ and $R^4$ represent together with the nitrogen atom the radical of a saturated five-membered or six-membered heterocyclic amine, and "alkylene" represents a straight or branched alkylene chain having from 2–6 C atoms, at least 2 C atoms being in the chain directly connecting the ring carbon atom with the nitrogen atom, in the presence of a condensing agent such as alkaliamides, for example potassium amide or butyllithium, or the like, and isolating the compound of Formula I obtained either as the free amine or as a non-toxic acid addition salt.

This method forms part of the present invention and is particularly well suited when preparing compounds of the Formula I wherein $R^1$ and $R^2$ represent alkyl groups other than methyl groups, for example, ethyl groups.

When —A— represents

and one of $R^1$ and $R^2$ represents a hydrogen atom the starting dihydroxy compounds of Formula II may conveniently be prepared by reacting the compound

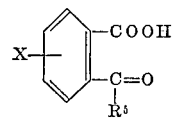

wherein X and $R^5$ are as defined above with

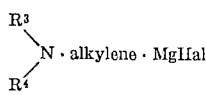

wherein $R^3$ and $R^4$ represent lower-alkyl groups or together with the nitrogen atom form a saturated five- or six-membered ring, and "alkylene" represents an alkylene chain with 3 C atoms in the chain directly connecting the ring carbon atom with the nitrogen atom, and reacting the thus formed compound of the general formula:

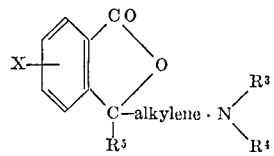

with a Grignard compound R¹MgHal and reducing the resulting compound of the general formula:

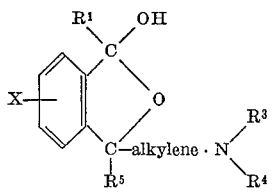

with LiAlH₄ to give the starting dihydroxy compound of Formula II. Also this method forms part of the present invention.

When compounds of Formula I where —A— represents the group

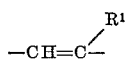

are required they may suitably be prepared from the compounds of Formula I wherein —A— represents the group

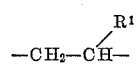

by reacting this compound with bromosuccinimide and treating the resulting bromo derivative with an alkali metal alcoholate such as sodium ethylate and isolating the resulting compound of Formula I. Also this method is within the scope of the present invention.

The following examples are given by way of illustration only and are not to be construed as limiting.

EXAMPLE 1

1-(3-dimethylaminopropyl)-1-phenyl-3,3-dimethyl-phthalane and its hydrochloride 20 grams of 4 - dimethylamino - 1 - phenyl - 1 - [2-(2-hydroxy-2-propyl)phenyl]-butanol-1, prepared as described in British Patent No. 939,856, where dissolved in 200 milliliters of concentrated hydrochloric acid and boiled under reflux for 15 minutes. The solution was poured on finely crushed ice and made alkaline by adding aqueous ammonia. The resulting mixture was extracted with ether, the ether phase dried over anhydrous potassium carbonate, filtered and evaporated on a vapour bath. The residue was dissolved in 50 milliliters of acetone and neutralized to pH 5 with a solution of dry hydrogen chloride in ether. When cooling 18 grams of the hydrochloride of 1-(3-dimethylaminopropyl) - 1 - phenyl-3,3-dimethylphthalane crystallized out. It was sucked off and dried M.P. 172–173 degrees centigrade.

EXAMPLE 2

1-(3-dimethylaminopropyl)-1-p-toly-3,3-dimethyl-phthalane and its hydrochloride

When Example 1 is carried out using 21 grams of 4-dimethylamino-1-p-tolyl-1-[2-(2 - hydroxy - 2 - propyl) phenyl]-butanol-1 (M.P. 82–83 degrees centigrade) instead of 4 - dimethylamino - 1 - phenyl - 1 - [2 - (2-hydroxy - 2 - propyl)phenyl] - butanol - 1, the hydrochloride of 1 - (3 - dimethylaminopropyl) - 1 - p - tolyl-3,3-dimethylphthalane is obtained as a white crystalline substance melting at 180–181.5 degrees centigrade. Yield 17 grams.

EXAMPLE 3

1-(3-dimethylaminopropyl)-1-p-fluoro-phenyl-3,3-dimethyl-phthalane and its hydrochloride When Example 1 is carried out using 21 grams of 4-dimethylamino - 1 - p - fluorophenyl - 1 - [2 - (2 - hydroxy - 2 - propyl) - phenyl] - butanol - 1 (M.P. 90 degrees centigrade) instead of 4 - dimethylamino-1-phenyl-1 - [2 - (2 - hydroxy - 2 - propyl)phenyl] - butanol - 1, the hydrochloride of 1 - (3 - dimethylamino - propyl)-1 - p - fluorophenyl - 3,3 - dimethyl - phthalane is obtained as a white crystalline substance melting at 150–152 degrees centigrade. Yield 19 grams.

EXAMPLE 4

1-(3-dimethylaminopropyl)-1-m-trifluoromethylphenyl-3,3-dimethyl-phthalane and its hydrochloride 25 grams of 4 - dimethylamino - 1 - m - trifluoromethylphenyl - 1 - [2 - (2 - hydroxy - 2 - propyl)phenyl]-butanol-1 (M.P. 125–127 degrees centigrade) were added successively to 100 milliliters of concentrated sulphuric acid while stirring. The temperature was kept below 10 degrees centigrade, and when all had been dissolved the reaction mixture was poured onto finely crushed ice, and worked up as described in Example 1. 1-(3-dimethylaminopropyl) - 1 - m - trifluoromethylphenyl - 3,3 - dimethyl-phthalane was isolated in the form of its hydrochloride which melts at 163–164 degrees centigrade. Yield 22 grams.

EXAMPLE 5

1-(3-dimethylaminopropyl)-1-phenyl-3,3-dimethyl-6-chloro-phthalane and its hydrochloride 6-chloro-3,3-dimethylphthalide is prepared from 6-nitro-3,3-dimethylphthalide by reduction with stannochloride in concentrated hydrochloric acid, cooling of the resulting solution, diazotization and treatment with a solution of cuprochloride in hydrochloric acid. The resulting 6-chloro-3,3-dimethylphthalide is isolated by extraction with ether, drying of the ether solution, evaporation of the ether and crystallization of the residue from petroleum ether as a white crystalline substance melting at 62–64 degrees centigrade.

To a solution of phenylmagnesiumbromide prepared from 79 grams (0.5 mole) bromobenzene and 15 grams of magnesium turnings in 500 milliliters of ether is added while stirring and refluxing a solution of 78 grams (0.4 mole) of 6-chloro-3,3-dimethylphthalide in 300 milliliters of dry ether. After the addition was completed, the reaction mixture was boiled with reflux for 15 minutes, whereupon the reaction mixture was poured onto finely crushed ice. The magnesium hydroxide which precipitates was brought into solution by addition of dilute sulphuric acid and the oil was taken over in ether. The ether solution was dried and evaporated and the residue was crystallized from petroleum ether. The thus obtained o-benzoyl-p-chlorophenyl-dimethylcarbinol is a white crystalline substance melting at 138–140 degrees centigrade.

15 grams of magnesium turnings, 25 milliliters of dry tetrahydrofuran, 0.1 milliliter ethylbromide and a crystal of iodine were placed in a 500 ml. three necked flask fitted with a stirrer, dropping funnel and reflux condenser. When reaction had started a solution of 61 grams (0.5 mole) of freshly distilled 3-dimethylaminopropylchloride in 300 milliliters of tetrahydrofuran was added dropwise during 30 minutes, whereafter the reaction mixture was boiled under reflux for 3 hours. A solution of 55 grams of o-benzoyl-p-chlorophenyl-dimethylcarbinol in 200 milliliters of dry tetrahydrofuran was then added dropwise while stirring in the course of 5 minutes. The reaction mixture was then heated for 2 hours on a steam bath under reflux and while stirring. After cooling the reaction mixture was poured into ice water and made acid with acetic acid. One liter of ether was added and the mixture shaken in a separatory funnel. The aqueous phase was drawn off and the ether phase washed once with a dilute aqueous acetic acid solution. The combined acid aqueous phases were made alkaline with aqueous ammonia and the oil which separated was extracted with ether. The ether solution was dried over anhydrous potassium carbonate, treated with active carbon and the ether evaporated. The residue was dissolved in hot petroleum ether. By cooling the resulting 4 - dimethylamino - 1 - phenyl - 1 - [2 - (2 - hydroxy - 2-propyl)-5-chlorophenyl]-butanol-1 was isolated as a white crystalline substance melting at 110.5–112 degrees centigrade. Yield 48 grams.

By replacing the 4-dimethylamino-1-phenyl-1-[2-(2-hydroxy-2-propyl)phenyl]-butanol-1 used in Example 1 with 22 grams of 4-dimethylamino-1-phenyl-1-[2-(2-hydroxy-2-propyl)-5-chlorophenyl]-butanol-1, the hydrochloride of 1-(3-dimethylaminopropyl)-1-phenyl-3,3-dimethyl-6-chlorophthalane is obtained as a white crystalline substance which first sinters at 180 degrees centigrade and finally melts at 196–198 degrees centigrade.

EXAMPLE 6

1-(3-dimethylaminopropyl)-1-phenyl-3,3-dimethyl-6-methoxy-phthalane and its hydrochloride When Example 1 is carried out using 21 grams of 4-dimethylamino - 1 - phenyl - 1 - [2 - (2 - hydroxy - 2 - propyl)-5-methoxyphenyl]-butanol-1 instead of 4-dimethylamino - 1 - phenyl - 1 - [2 - (2 - hydroxy - 2 - propyl)phenyl]-butanol-1, the hydrochloride of 1-(3-dimethylaminopropyl)-1-phenyl-3,3-dimethyl-6-methoxy-phthalane is obtained as a white crystalline substance.

EXAMPLE 7

1-(3-dimethylaminopropyl)-1-p-tolyl-3,3-dimethyl-6-chloro-phthalane and its hydrochloride When Example 1 is carried out using 22 grams of 4-dimethylamino - 1 - p - tolyl - 1 - [2 - (2 - hydroxy - 2 - propyl)-5-chlorophenyl]-butanol-1 instead of 4-dimethylamino - 1 - phenyl - 1 - [2 - (2 - hydroxy - 2 - propyl)phenyl]-butanol-1, the hydrochloride of 1-(3-dimethylaminopropyl)-1-p-tolyl-3,3-dimethyl-6-chloro-phthalane is obtained.

EXAMPLE 8

1-(3-diethylaminopropyl)-1-phenyl-3,3-dimethyl-phthalane and its hydrochloride

When Example 1 is carried out using 21 grams of 4-diethylamino - 1 - phenyl - 1 - [2 - (2 - hydroxy - 2 - propyl)phenyl]-butanol-1 instead of 4-dimethylamino-1-phenyl-1-[2-(2-hydroxy-2-propyl)phenyl]-butanol-1, the hydrochloride of 1-(3-diethylaminopropyl)-1-phenyl-3,3-dimethyl-phthalane is obtained as a white powder.

EXAMPLE 9

1-(3-di-n-butylaminopropyl)-1-phenyl-3,3-dimethyl-phthalane and its hydrochloride When Example 1 is carried out using 23 grams of 4-di - n - butylamino - 1 - phenyl - 1 - [2 - (2 - hydroxy - 2-propyl)phenyl]-butanol-1 instead of 4-dimethylamino-1-phenyl - 1 - [2 - (2 - hydroxy - 2 - propyl)phenyl] - butanol-1, the hydrochloride of 1-(3-di-n-butylaminopropyl)-1-phenyl-3,3-dimethyl-phthalane is obtained as a white crystalline substance.

EXAMPLE 10

1-(3-N-piperidinylpropyl)-1-phenyl-3,3-dimethyl-phthalane and its hydrochloride

When Example 1 is carried out using 22 grams of 4-N-piperidinyl - 1 - phenyl - 1 - [2 - (2 - hydroxy - 2 - propyl) phenyl]-butanol-1 instead of 4-dimethylamino-1-phenyl-1-[2-(2-hydroxy-2-propyl)phenyl]-butanol-1, the hydrochloride of 1-(3-N-piperidinylpropyl)-1-phenyl-3,3-dimethyl-phthalane is obtained.

EXAMPLE 11

1-[3-(N'-methyl-N-piperazino)propyl]-1-phenyl-3,3-dimethyl-phthalane and its hydrochloride When Example 1 is carried out using 23 grams of 4-(N'-methyl - N - piperazinyl) - 1 - phenyl - 1 - [2 - (2 - hydroxy-2-propyl)phenyl]-butanol-1 instead of 4-dimethylamino - 1 - phenyl - 1 - [2 - (2 -hydroxy - 2 - propyl)phenyl]-butanol-1, the hydrochloride of 1-[3-(N'-methyl-N-piperazino)propyl]-1-phenyl-3,3-dimethyl-phthalane is obtained.

EXAMPLE 12

1-[3-(4-morpholinyl)propyl]-1-phenyl-3,3-dimethyl-phthalane and its hydrochloride When Example 1 is carried out using 23 grams of 4-(4-morpholinyl) - 1 - phenyl - 1 - [2 - (2 - hydroxy - 2 - propyl)phenyl]-butanol-1 instead of 4-dimethylamino-1-phenyl - 1 - [2 - (2 - hydroxy - 2 - propyl)phenyl] - butanol - 1, the hydrochloride of 1-[3-(4-morpholinyl)propyl]-1-phenyl-3,3-dimethyl-phthalane is obtained.

EXAMPLE 13

1-(3-dimethylaminopropyl)-1-phenyl-phthalane and its hydrochloride 10 grams of 4-dimethylamino-1-phenyl-1-(2-hydroxymethylphenyl)-butanol-1 (M.P. 106–107 degrees centigrade), were dissolved in 50 milliliters of 60% phosphoric acid, and heated for three hours on a steam bath. The reaction mixture was poured on finely crushed ice, and the resulting solution was made alkaline with aqueous ammonia. The further working up of the resulting mixture was carried out as described in Example 1. 7 grams of the hydrochloride of 1-(3-dimethylaminopropyl)-1-phenyl-phthalane were obtained as colourless crystals melting at 176–177 degrees centigrade.

EXAMPLE 14

1-(3-dimethylaminopropyl)-1-(o-tolyl)-3,3-diethyl-phthalane and its hydrochloride To 4 grams (0.1 mole) of LiAlH$_4$ in 200 milliliters of dry ether is added dropwise and under reflux a solution of 56 grams (0.2 mole) of 1-(o-tolyl)-3,3-diethyl-phthalanol-(1) in 200 milliliters of ether. The reaction mixture is heated under reflux while stirring for one hour on a steam bath, whereupon the mixture is cooled and 30 milliliters of water are added dropwise under agitation and cooling. The ether phase is decanted from the precipitate formed by the addition of water and the ether evaporated on a steam bath. The residue was dissolved in 200 milliliters of hot petroleum ether and upon cooling 51 grams of 3-[2-(α-hydroxy-2-methylbenzyl)-phenyl]pentanol-3 crystallized out as white crystals melting at 105–106 degrees centigrade.

50 grams of 3-[2-(α-hydroxy-2-methylbenzyl)-phenyl] pentanol-3 were dissolved in a mixture of 500 milliliters of glacial acetic acid and 100 milliliters of concentrated hydrochloric acid. About 500 milliliters were distilled from the mixture, whereupon the residue was poured onto ice and neutralized with dilute sodiumhydroxide solution. The phthalane which separated out was extracted with petroleum ether and crystallized from the solution by cooling. Yield 45 grams of 1-(o-tolyl)-3,3-diethylphthalane obtained as a white crystalline substance melting at 64.5–65.5 degrees centigrade.

To 0.11 mole of potassiumamide (prepared from 4.4 grams of potassium) in 400 milliliters of liquid ammonia were added while stirring 27 grams (0.1 mole) of 1-(o-tolyl)-3,3-diethylphthalane dissolved in 40 milliliters of dry ether. The solution turned strongly red. After the addition had been completed the mixture was stirred for 15 minutes, whereupon 13 grams (0.11 mole) of freshly distilled 3-dimethylamino-propylchloride were added. The red colour disappeared in the course of one minute whereupon the ammonia was evaporated and 500 milliliters of anhydrous ether were added and the solution heated for 15 minutes under reflux. The mixture was cooled and extracted with dilute hydrochloric acid. The acid solution was then made alkaline with dilute aqueous ammonia and the base which separated out was extracted with ether. The ether extract was dried over anhydrous potassium carbonate, evaporated and the residue dissolved in 40 milliliters of acetone. The acetone solution was made faintly acid with a solution of dry hydrogen chloride in ether and the hydrochloride of 1-(3-dimethylaminopropyl)-1-(o- tolyl)-3,3-diethyl-phthalane which separated out was sucked off as white crystals melting at 214–216 degrees centigrade. Yield 6 grams.

EXAMPLE 15

1-(3-methylaminopropyl)-1-phenyl-3,3-dimethyl-phthalane and its hydrochloride

To a solution of 31 grams (0.1 mole) of 1-(3-dimethylaminopropyl)-1-phenyl-3,3-dimethyl-phthalane in 250 milliliters of dry benzene, 33 grams (0.3 mole) of ethylchloroformate were added dropwise and while stirring. The temperature rose to about 35 degrees centigrade. After the addition had been completed the mixture was heated for 1½ hours at 40 degrees centigrade while stirring. After cooling, the reaction mixture was washed with dilute hydrochloric acid and evaporated on a steam bath and fiinally at reduced pressure. 1-[3-(N-carbethoxy-methylamino)propyl-1-phenyl]-3,3 - dimethyl - phthalane was obtained as a crystalline substance melting at 50–51 degrees centigrade.

The thus obtained yellow oil was boiled for 20 hours under reflux with a mixture of 18 milliliters of water, 18 grams of potassium hydroxide and 125 milliliters of diethyleneglycol-monomethylether. After cooling the reaction mixture was poured into 600 milliliters of water and extracted with ether. The ether phase was then extracted twice with dilute acetic acid, and the acid extract made alkaline with aqueous ammonia, whereupon the oil which separated was extracted with ether. The ether phase was dried over anhydrous potassium carbonate, filtered and evaporated on a steam bath. The residue was dissolved in 100 milliliters of acetone and neutralized to pH 5 with a solution of dry hydrogen chloride in ether. The white crystals which separated out consisted of the hydrochloride of 1-(3-methylaminopropyl)-1-phenyl-3,3-dimethyl-phthalane and melted at 190–191 degrees centigrade. Yield 16 grams.

EXAMPLE 16

1-(3-methylaminopropyl)-1-m-trifluoromethylphenyl - 3,3-dimethyl-phthalane and its hydrogen sulphate When Example 15 was carried out using the equivalent amount of 1-(3-dimethylaminopropyl)-1-m-trifluoromethylphenyl-3,3-dimethyl-phthalane instead of 1-(3-dimethylaminopropyl)-1-phenyl-3,3 - dimethyl - phthalane except that the acetone solution was neutralized to pH 2 with a solution of concentrated sulphuric acid in ether, the hydrogen sulphate of 1-(3-methylaminopropyl)-1-m-trifluoromethylphenyl-3,3-dimethyl-phthalane was obtained as colourless crystals melting at 158–160 degrees centigrade.

EXAMPLE 17

1-(3-dimethylaminopropyl)-1-(2-thienyl)-3,3-dimethyl-phthalane

When Example 1 is carried out using the equivalent amount of 4-dimethylamino-1-(2-thienyl)-1-[2-hydroxy-2-propyl)phenyl]-butanol-1 (M.P. 93–96 degrees centigrade) instead of 4-dimethylamino-1-phenyl-1-[2-(2-hydroxy-2-propyl)phenyl]-butanol-1, 1-(3-dimethylaminopropyl)-1-(2-thienyl)-3,3-dimethylphthalane was obtained as an oil.

EXAMPLE 18

1-(3-dimethylaminopropyl)-1-[2-(5-bromothienyl)]-3,3-dimethyl-phthalane

When Example 1 is carried out using the equivalent amount of 4-dimethylamino-1-[2-(5-bromothienyl)]-1-[2-(2-hydroxy-2-propyl)phenyl]-butanol-1 instead of 4-dimethylamino-1-phenyl-1-[2-(2 - hydroxy - 2 - propyl)-phenyl] - butanol-1, 1-(3-dimethylaminopropyl)-1-[2-(5-bromothienyl)]-3,3-dimethyl-phthalane is obtained.

EXAMPLE 19

1-(3-dimethylaminopropyl)-1-phenylisochroman and its hydrochloride

When Example 13 was carried out using the equivalent amount of 4-dimethylamino-1-phenyl-1-[2-(2-hydroxyethyl)-phenyl]-butanol-1 (M.P. 116–118 degrees centigrade) instead of 4-dimethylamino-1-phenyl-1-(2-hydroxymethyl-phenyl)-butanol-1, the hydrochloride of 1-(3-dimethylaminopropyl)-1-phenyl-isochromane was obtained as a white crystalline substance which after recrystallization from acetone melts at 178–180 degrees centigrade.

EXAMPLE 20

1-(3-dimethylaminopropyl)-1-phenyl-3-methyl phthalane and its oxalate

When Example 13 was carried out using the equivalent amount of 4-dimethylamino-1-phenyl-1-[2-(1-hydroxyethyl)]-phenyl-butanol-1 (M.P. 111 degrees centigrade) instead of 4-dimethylamino-1-phenyl-1-(2-hydroxymethylphenyl)-butanol-1 and using a solution of oxalic acid in acetone instead of a solution of dry hydrogen chloride in ether, the oxalate of 1-(3-dimethylaminopropyl)-1-phenyl-3-methyl-phthalane was obtained as a white, crystalline substance melting at 115–116 degrees centigrade.

EXAMPLE 21

1-(3-dimethylaminopropyl)-1-phenyl-3-ethyl-phthalane and its hydrochloride

When Example 13 was carried out using the equivalent amount of 4-dimethylamino - 1 - phenyl-1-[2-(1-hydroxypropyl)]-phenyl-butanol-1 (M.P. 114–116 degrees centigrade) instead of 4 - dimethylamino - 1 - phenyl-1-(2-hydroxymethylphenyl)-butanol-1, the hydrochloride of 1-(3-dimethylaminopropyl)-1-phenyl - 3 - ethyl-phthalane was obtained as white crystals melting at 160–163 degrees centigrade.

EXAMPLE 22

1-(3-dimethylaminopropyl)-1-phenyl-3,3-diethyl-phthalane and its hydrochloride

When Example 14 was carried out using the equivalent amount of 1-phenyl-3,3-diethyl-phthalanol-(1) instead of 1-(o-tolyl)-3,3-diethyl-phthalanol-(1), the hydrochloride of 1-(3-dimethylaminopropyl) - 1 - phenyl - 3,3 - diethyl-phthalane was obtained as white crystals melting at 151–153 degrees centigrade.

EXAMPLE 23

1-(3-methylaminopropyl)-1-phenyl-isochroman and its hydrochloride

When Example 15 was carried out using the equivalent amount of 1-(3 - dimethylaminopropyl)-1-phenylisochroman instead of 1-(3-dimethylaminopropyl)-1-phenyl-3,3-dimethyl-phthalane, the hydrochloride of 1 - (3 - methylaminopropyl) - 1 - phenyl-isochroman was obtained as a white crystalline substance melting at 199–201 degrees centigrade.

EXAMPLE 24

1-(3-dimethylaminopropyl)-1-phenyl-isochromen and its hydrochloride 10 grams of 1-(3-dimethylaminopropyl)-1-phenyl-isochroman were dissolved in 100 milliliters of benzene. 6 grams of N-bromosuccinimide were then added in small portions, whereupon the mixture was refluxed for a few minutes on a steam bath. After cooling the mixture was washed with water and the benzene solution was evaporated. The residue was refluxed on a steam bath for 15 minutes with a solution of sodium ethylate prepared from 1 gram of sodium in 50 milliliters of ethanol. The ethanol was then evaporated, water was added and the mixture extracted with ether. The ether phase was dried over anhydrous potassium carbonate and evaporated on a steam bath. The residue was dissolved in acetone and the hydrochloride precipitated as a white crystalline substance by neutralization with a solution of dry hydrogen chloride in acetone.

EXAMPLE 25

1-(3-dimethylaminopropyl)-3,3-dimethyl-phthalane and its acid oxalate

The starting dihydroxy compound, 4-dimethylamino-1-[2 - (2-hydroxy-2-propyl)phenyl]-butanol-1 was prepared in the following way:

To a solution of 3-dimethylaminopropylmagnesium chloride prepared from 13 grams of magnesium turnings and 67 grams of 3-dimethylaminopropylchloride in 250 milliliters of dry tetrahydrofuran was added dropwise a solution of 80 grams of 3,3-dimethylphthalide in 200 milliliters of dry tetrahydrofuran. After the vigorous reaction had subsided the reaction mixture was heated on a steam bath for ten minutes, whereupon the mixture was poured into 1 liter of ice-water. The resulting mixture was made acid by addition of dilute hydrochloric acid, the aqueous phase was separated and washed with ether and made alkaline with aqueous ammonia. The base which separated out was extracted with ether, the ether phase dried over anhydrous potassium carbonate and the ether evaporated. 86 grams of 1 - (3 - dimethylaminopropyl)-3,3-dimethylphthalane-1-ol was obtained as a yellow oil.

35 grams of 1-(3-dimethylaminopropyl)-3,3-dimethylphthalane-1-ol were dropwise added while stirring and under reflux to a suspension of 7 grams of lithium aluminium-hydride in 100 milliliters of dry ether. After the addition was completed the reaction mixture was refluxed for 30 minutes. Thereafter water was added dropwise while stirring and cooling until the hydroxides of aluminium and lithium formed by the hydrolysis formed a sticky mass on the bottom of the flask. The ether phase was decanted off, and the precipitate washed with ether, the combined ether phases were evaporated and the residue dissolved in 200 milliliters of petroleum ether. Upon cooling 34 grams of 4-dimethylamino-1-[2-(2-hydroxy-2-propyl)phenyl]-butanol-1 separates as white crystals melting at 73–75 degrees centigrade.

This base was dissolved in a mixture of 200 milliliters of glacial acetic acid and 50 milliliters of concentrated hydrochloric acid and refluxed for 10 minutes. Thereupon the reaction mixture was poured onto finely crushed ice and made alkaline with sodium hydroxide. The base which separated out was extracted with ether, the ether phase dried over anhydrous potassium carbonate, filtered and the ether evaporated, whereupon the residue was dissolved in 150 milliliters of ethanol. The solution was then neutralized to pH 5 with a solution of oxalic acid in ethanol and an equal volume of ether was added. Upon standing and cooling for some time 27 grams of the acid oxalate of 1 - (3 - dimethylaminopropyl) - 1,1 - dimethylphthalane was obtained as a white crystalline substance melting at 116–118 degrees centigrade.

EXAMPLE 26

1-(3-dimethylaminopropyl)-1-cyclohexyl-3,3-dimethyl-phthalane and its acid oxalate When Example 1 was carried out using 21 grams of 4-dimethylamino-1-cyclohexyl - 1 - [2-(2-hydroxy-2-propyl)phenyl] - butanol - 1 instead of 4 - dimethylamino-1-phenyl-1-[2 - (2-hydroxy-2-propyl)phenyl]-butanol-1 and neutralizing to pH 5 with a solution of oxalic acid in acetone instead of hydrogen chloride in acetone, the acid oxalate of 1-(3 - dimethylaminopropyl)-1-cyclohexyl-3,3-dimethylphthalane was obtained as a white crystalline substance melting at 100–115 degrees centigrade.

EXAMPLE 27

1-(3-dimethylaminopropyl)-1-p-chlorophenyl-3,3-dimethylphthalane

When Example 1 was carried out using 22 grams of 4-dimethylamino-1-p-chlorophenyl-1-[2 - (2 - hydroxy-2-propyl)phenyl]-butanol-1 instead of 4-dimethylamino-1-phenyl-1-[2 - (2-hydroxy-2-propyl)phenyl]-butanol-1 and distilling the base instead of neutralizing with an acid 1-(3-dimethylaminopropyl) - 1 - p - chlorophenyl-3,3-dimethylphthalane was obtained as a colourless oil boiling at 173–175 degrees centigrade/1 mm. Hg.

EXAMPLE 28

1-(3-dimethylaminopropyl)-1-phenyl-3,3-diethyl-phthalane and its hydrochloride

When Example 1 was carried out using 21 grams of 4-dimethylamino-1-phenyl-1-[2 - (3 - hydroxy-3-pentyl)phenyl]-butanol-1 instead of 4-dimethylamino-1-phenyl-1-[2-(2-hydroxy-2-propyl)phenyl]-butanol-1, the hydrochloride of 1-(3 - dimethylaminopropyl)-1-phenyl-3,3-diethyl-phthalane was obtained as white crystals melting at 151–153 degrees centigrade.

EXAMPLE 29

1-(3-methylaminopropyl) - 1 - phenyl - phthalane, 1-(3 - methylaminopropyl) - 1 - phenyl - 3,3 - diethyl-phthalane, 1 - (3 - methylaminopropyl) - 1 - phenyl-3-methyl - phthalane, 1-(3-methylaminopropyl)-1-p-fluorophenyl - 3,3-dimethylphthalane, 1 - (3 - methylaminopropyl) - 1 - p - chlorophenyl - 3,3 - dimethyl - phthalane, 1 - (3 - ethylaminopropyl) - 1 - phenyl - 3,3 - dimethyl-phthalane and 1-(3-methylaminopropyl) - 3,3-dimethyl-phthalane and acid addition salts thereof.

When Example 15 was carried out using equivalent amounts of 1-(3-dimethylaminopropyl)-1-phenyl - phthalane, 1 - (3 - dimethylaminopropyl) - 1 - phenyl - 3,3-diethyl - phthalane, 1 - (3-dimethylaminopropyl) - 1-phenyl - 3 - methyl - phthalane, 1 - (3 - dimethylaminopropyl)-1-p-fluorophenyl - 3,3 - dimethyl-phthalane, 1-(3 - dimethylaminopropyl) - 1 - p - chloro - phenyl-3,3 - dimethyl - phthalane, 1 - (3 - diethylaminopropyl)-1 - phenyl - 3,3 - dimethyl - phthalane and 1 - (3-dimethylaminopropyl) - 3,3 - dimethyl - phthalane respectively instead of 1 - (3 - dimethylaminopropyl) - 1-phenyl - 3,3 - dimethyl - phthalane there was obtained 1 - (3 - methylaminopropyl) - 1 - phenyl - phthalane, hydrochloride (M.P. 116–118 degrees centigrade), 1-(3-methylaminopropyl) - 1 - phenyl - 3,3-diethyl - phthalane, oxalate (M.P. 188–190 degrees centrigrade), 1 - (3-methylaminopropyl) - 1 - phenyl - 3 - methyl - phthalane, oxalate (M.P. 151 degrees centigrade), 1-(3-methylaminopropyl) - 1 - p - fluorophenyl - 3,3 - dimethyl - phthalane, hydrochloride (M.P. 205–206 degrees centrigrade), 1 - (3-methylaminopropyl) - 1 - p - chlorophenyl - 3,3 - dimethyl-phthalane, hydrochloride (M.P. 178–179 degrees centigrade), 1 - (3 - ethylaminopropyl) - 1 - phenyl - 3,3-dimethyl - phthalane (B.P. 160–165 degrees centrigared/1 mm. Hg) and 1 - (3 - methyl aminopropyl) - 3,3 - dimethyl - phthalane, oxalate (M.P. 170–172 degrees centigrade) respectively.

EXAMPLE 30

1-(3-dimethylamino-iso-butyl)-1-phenyl-3,3-dimethyl-phthalane and its hydrochloride When Example 1 was carried out using 21 grams of 4-dimethylamino - 3 - methyl-1-phenyl-1-[2-(2-hydroxy-2-propyl) - phenyl]-butanol-1 instead of 4 - dimethylamino - 1 - phenyl - 1 - [2-(2-hydroxy - 2 - propyl)phenyl]-butanol-1 there was obtained the hydrochloride of 1-(3-dimethylamino - iso - butyl)-1-phenyl - 3,3 - dimethyl - phthalane as a white crystalline substance melting at 177–179 degrees centigrade.

EXAMPLE 31

1-(3-dimethylaminopropyl)-1-phenyl-3,3-dimethyl-phthalane and its hydrochloride

The starting 1-phenyl-3,3-dimethylphthalane (M.P. 67–68 degrees centigrade) was prepared as described in Example 1 for the corresponding 1-(o-tolyl)-3,3-diethyl-phthalane by using equivalent amounts of 1-phenyl-3,3-dimethyl - phthalanol-(1) instead of 1 - (o-tolyl)-3,3-diethyl-phthalanol-(1). The intermediate 2-[2-(α-hydroxybenzyl)-phenyl]propanol-2 melted at 70–72 degrees centigrade.

To a solution of butyllithium in 200 milliliters of dry ether, prepared from 30 grams of butylbromide, was added at room temperature, while stirring 40 grams of 1-phenyl-3,3-dimethylphthalane, whereupon the mixture was refluxed for 5 minutes. The solution turns red, due to the formation of the lithium compound of 1-phenyl-3,3-dimethyl-phthalane. Then 24 grams of freshly distilled 3-dimethylaminopropyl-chloride were added which caused an exothermic reaction and made the reaction mixture boil for about 5 minutes. The mixture was then heated for further half an hour on a steam bath. The ether phase was then extracted with dilute hydrochloric acid and the base precipitated from the acid solution by addition of the aqueous ammonia to alkaline reaction, whereupon the base was extracted with ether, the ether phase dried over anhydrous potassium carbonate and the ether evaporated. The residue was dissolved in 100 milliliters of acetone and neutralized to pH 5 with a solution of dry hydrogen chloride in ether. When cooling 36 grams of the hydrochloride of 1-(3-dimethylaminopropyl)-1-phenyl-3,3-dimethyl-phthalane crystallized out. It was sucked off and dried. M.P. 172–173 degrees centigrade.

EXAMPLE 32

1-(2-dimethylaminoethyl)-3,3-dimethyl-phthalane

To a solution of butyllithium in 100 milliliters of ether, prepared from 14 grams of butylbromide was added under reflux and while stirring a solution of 12 grams of 1,1-dimethylphthalane in 20 milliliters of ether. The solution turned strongly red. After 2 minutes heating on a steam bath 12 grams of freshly distilled 2-dimethyl-amino-ethylchloride were added dropwise which caused a vigorous reaction to set in with resulting disappearance of the red colour. The working up of the reaction mixture was as in Example 31 with the exception that no crystalline acid addition salt could be isolated as they were all too hygroscopic. Instead the base was fractionally distilled and 18 grams of 1-(2-dimethylaminoethyl)-3,3-dimethyl-phthalane were obtained as a colourless oil boiling at 125–130 degrees centrigrade/1 mm. Hg.

EXAMPLE 33

1-(3-dimethylaminopropyl)-1-cyclohexyl-3,3-dimethyl-phthalane and its acid oxalate When Example 31 was carried out using 40 grams of 1-cyclohexyl-3,3-dimethyl-phthalane instead of 1-phenyl-3,3-dimethyl-phthalane and neutralizing with a solution of oxalic acid in acetone instead of dry hydrogen chloride in ether the acid oxalate of 1-(3-dimethylaminopropyl)-1-cyclohexyl-3,3-dimethylphthalane was obtained as a white crystalline substance melting unsharply at 100–115 degrees centigrade. The corresponding base was isolated in a yield of 31 grams and distilled in vacuo. B.P. 145–150 degrees centigrade/.01 mm. Hg.

EXAMPLE 34

1-(2-dimethylaminoethyl)-1-phenyl-3,3-dimethyl-phthalane and its hydrochloride

When Example 31 was carried out using the equivalent amount of 2-dimethylaminoethylchloride instead of 3-dimethylaminopropylchloride the hydrochloride of 1-(2-dimethylaminoethyl)-1-phenyl-3,3-dimethyl-phthalane was obtained as a white crystalline substance melting at 204–206 degrees centigrade.

EXAMPLE 35

1-[3-(1-(4-(2-hydroxyethyl))piperazinyl)propyl]-1-phenyl-3,3-dimethyl-phthalane and its dihydrochloride The red solution of the lithium compound of 1-phenyl-3,3-dimethyl-phthalane prepared exactly as described in Example 31 from 40 grams of 1-phenyl-3,3-dimethyl-phthalane, kept at minus 5 degrees centigrade in an atmosphere of nitrogen, was added dropwise while stirring vigorously and cooling to a solution of 200 grams of 1,3-dibrompropane in 2 liters of dry ether. The reaction mixture was kept at 5–15 degrees centigrade during the addition. After the addition was completed the solution was washed with water, dried over anhydrous magnesium sulphate, filtered and the ether evaporated. The residue was distilled in vacuo and 23 grams of 1-(3-bromopropyl)-1-phenyl-3,3-dimethylphthalane obtained as a colourless oil boiling at 160–170 degrees centigrade/0.5 mm. Hg.

The 23 grams of the bromo-compound were heated for 4 hours on a steam bath with 50 grams of 1-(2-hydroxyethyl)-piperazine. The reaction mixture was poured into 500 milliliters of water and extracted with ether. The ether phase was then extracted with dilute hydrochloric acid and the acid aqueous extract made alkaline with dilute sodium hydroxide solution. The base which separated out was extracted with ether, the ether phase dried over anhydrous potassium carbonate, filtered and evaporated. The residue was dissolved in 50 milliliters of 99% ethanol and neutralized to pH 3 with a solution of dry hydrogen chloride in ether. Upon cooling 13 grams of the dihydrochloride of 1-[3-(1-(4-(2-hydroxyethyl))piperazinyl)propyl]-1-phenyl-3,3-dimethylphthalane were obtained as white crystals melting at 230–235 degrees centigrade.

EXAMPLE 36

1-(3-methylaminopropyl)-1-phenyl-3,3-dimethyl-phthalane and its hydrochloride

When Example 31 was carried out using the equivalent amount of 3-methylaminopropylchloride instead of 3-dimethylaminopropylchloride the hydrochloride of 1-(3-methylaminopropyl) - 1-phenyl-3,3-dimethylphthalane was obtained as a white crystalline substance melting at 190–191 degrees centigrade.

EXAMPLE 37

1-(2-methylaminoethyl)-1-phenyl-3,3-dimethyl-phthalane and its acid oxalate

When Example 31 was carried out using the equivalent amount of 2-methylaminoethylchloride instead of 3-dimethylaminopropylchloride and neutralizing with a solution of oxalic acid in acetone instead of hydrogen chloride in ether the acid oxalate of 1-(2-methylaminoethyl)-1-phenyl-3,3-dimethylphthalane was obtained as a white crystalline substance melting at 208–210 degrees centigrade.

The compounds of Formula I and the non-toxic acid addition salts thereof may be administered both orally and parenterally, and may be used for example in the form of tablets, capsules, powders, syrups or in the form of the usual sterile solutions for injection. Results upon administration have been very gratifying.

Most conveniently the compounds of Formula I are administered orally in unit dosage form such as tablets or capsules, each dosage unit containing a non-toxic acid addition salt of one of the said compounds in an amount of from about 0.1 to about 50 mg., most preferably, however, from about 0.5–25 mg., calculated as the free amine, the total daily dosage usually ranging from about 0.5 to about 300 mg. The exact individual dosages as well as daily dosages in a particular case will, of course, be determined according to established medical principles.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 10 mg. of 1-(3-methylaminopropyl)-1-phenyl - 3,3 - dimethyl-phthalane (called Lu 3–010 for short) in the form of its hydrochloride is as follows:

| | Mg. |
|---|---|
| Lu 3–010, hydrochloride | 11.2 |
| Potato starch | 36 |
| Lactose | 18 |
| Gelatine | 5 |
| Talcum | 6 |
| Magnesium stearate | 0.4 |

Any other pharmaceutical tableting adjuvants may be used provided they are compatible with the active ingredient, and additional compositions and dosage forms, may be similar to those presently used for thymoleptics such as imipramine, amitriptyline or nortriptyline. Also combination of the compounds of Formula I as well as their non-toxic acid salts with other active ingredients especially other thymoleptics, neuroleptics or the like fall within the scope of the present invention.

As previously stated, when isolating the compounds of Formula I in the form of an acid addition salt, the acid is preferably selected so as to contain an anion which is non-toxic and pharmacologically acceptable, at least in usual therapeutic doses. Representative salts which are included in this preferred group are the hydrochlorides, hydrobromides, sulphates, acetates, phosphates, nitrates, methanesulphonates, ethanesulphonates, lactates, citrates, tartrates, or bitartrates, and maleates of the amines of Formula I. Other acids are likewise suitable and may be employed if desired. For example, fumaric, benzoic, ascorbic, succinic, salicyclic, bismethylenesalicyclic, propionic, gluconic, malic, malonic, mandelic, cinnamic, citraconic, stearic, palmitic, itaconic, glycolic, benzenesulphonic, and sulphamic acids may also be employed as acid addition salt forming acids. When is is desired to isolate a compound of the invention in the form of the free base this may be done according to conventional procedure, as by dissolving the isolated or unisolated salt in water, treating with a suitable alkaline material, extracting the liberated free base with a suitable organic solvent, drying the liberated free base with a suitable organic solvent, drying the extract and evaporating to dryness or fractionally distilling to effect isolation of the free basic amine.

It is to be understood that the invention is not limited to the exact details of operation or exact compound or compositions shown and described, as obvious modifications and equivalents will be apparent to one skilled in the art.

We claim:
1. A compound selected from the group consisting of (a) compound of the general formula:

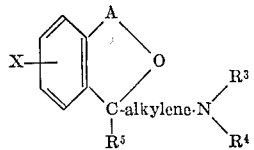

wherein A is selected from the group consisting of

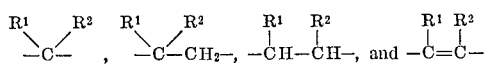

wherein $R^1$ and $R^2$ represents hydrogen or a lower-alkyl group,

is selected from the class consisting of mono-lower-alkylamino, di-lower-alkylamino, the radical of a saturated five-membered ring heterocyclic amine and the radical of a saturated six-membered ring heterocyclic amine selected from the group consisting of pyrrolidine, piperidine, morpholine, thiamorpholine, N'-lower-alkyl-piperazine, N'-lower-hydroxyalkyl-piperazine, piperazine, and such radicals containing from one to four C-lower-alkyl substituents, $R^5$ is selected from the group consisting of hydrogen, cyclohexyl, phenyl, thienyl, phenyl substituted with a substituent selected from the group consisting of halogen, lower-alkyl, lower-alkyloxy and trihalomethyl, thienyl substituted with a substituent selected from the group consisting of halogen, lower-alkyl, lower-alkyloxy and trihalomethyl, "alkylene" is an alkylene chain having from two to six carbon atoms, inclusive, at least two carbon atoms being in the chain directly connecting the ring carbon atom with the nitrogen atom, and X is selected from the group consisting of hydrogen, halogen, lower-alkyl, loweralkyloxy, and trihalomethyl, and (b) acid addition salts thereof with pharmaceutically acceptable acids.

2. A compound according to claim 1 of the following formula:

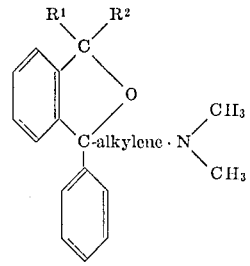

wherein $R^1$ and $R^2$ each is lower-alkyl and "alkylene" is an alkylene chain having from two to six carbon atoms, inclusive, at least two carbon atoms being in the chain directly connecting the ring carbon atom with the nitrogen atom.

3. An acid addition salt of a compound according to claim 1 of the formula:

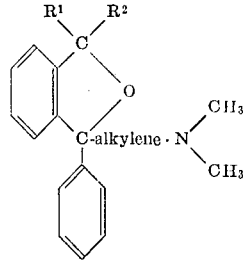

wherein $R^1$ and $R^2$ each is lower-alkyl and "alkylene" is an alkylene chain having from two to six carbon atoms, inclusive, at least two carbon atoms being in the chain directly connecting the ring carbon atom with the nitrogen atom.

4. A compound according to claim 1 of the formula:

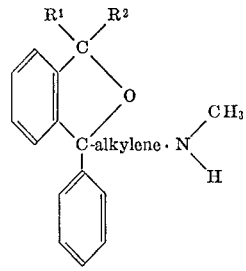

wherein $R^1$ and $R^2$ each is lower-alkyl and "alkylene" is an alkylene chain having from two to six carbon atoms, inclusive, at least two carbon atoms being in the chain directly connecting the ring carbon atom with the nitrogen atom.

5. An acid addition salt according to claim 1 of a compound of the formula:

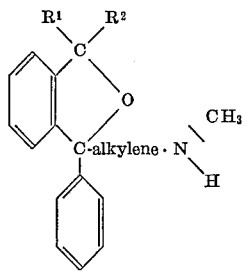

wherein $R^1$ and $R^2$ each is lower-alkyl and "alkylene" is an alkylene chain having from two to six carbon atoms, inclusive, at least two carbon atoms being in the chain directly connecting the ring carbon atom with the nitrogen atom.

6. 1-(3-dimethylaminopropyl)-1-phenyl-3,3 - dimethyl-phthalane.

7. A compound according to claim 1 which is an acid addition salt of 1-(3-dimethylaminopropyl)-1-phenyl-3,3-dimethyl-phthalane with a pharmaceutically acceptable acid.

8. Hydrochloride of 1 - (3 - dimethylaminopropyl)-1-phenyl-3,3-dimethyl-phthalane.

9. 1-(3-methylaminopropyl)-1-phenyl - 3,3 - dimethyl-phthalane.

10. A compound according to claim 1 which is an acid addition salt of 1-(3-methylaminopropyl)-1-phenyl-3,3-dimethyl-phthalane with a pharmaceutically acceptable acid.

11. Hydrochloride of 1 - (3 - methylaminopropyl)-1-phenyl-3,3-dimethyl-phthalane.

12. 1-(3-methylaminopropyl) - 1 - phenyl - 3 - methyl-phthalane.

13. A compound according to claim 1 which is an acid addition salt of 1-(3 - methylaminopropyl) - 1 - phenyl-3-methyl-phthalane with a pharmaceutically acceptable acid.

14. Acid oxalate of 1-(3-methylaminopropyl)-1-phenyl-3-methyl-phthalane.

15. 1-(2-methylaminoethyl)-1-phenyl - 3,3 - dimethyl-phthalane.

16. A compound according to claim 1 which is an acid addition salt of 1-(2-methylaminoethyl)-1-phenyl-3,3-dimethyl-phthalane with a pharmaceutically acceptable acid.

17. Acid oxalate of 1-(2-methylaminoethyl)-1-phenyl-3,3-dimethyl-phthalane.

18. 1-(3-methylaminopropyl) - 1 - m - trifluoromethylphenyl-3,3-dimethyl-phthalane.

19. A compound according to claim 1 which is an acid addition salt of 1-(3-methylaminopropyl)-1-m-trifluoromethylphenyl-3,3-dimethyl-phthalane with a pharmaceutically acceptable acid.

20. Hydrogen sulphate of 1-(3-methylaminopropyl)-1-m-trifluoromethylphenyl-3,3-dimethyl-phthalane.

21. 1-(3-dimethylaminopropyl)-3,3-dimethyl-phthalane.

22. A compound according to claim 1 which is an acid addition salt of 1-(3-dimethylaminopropyl)-3,3-dimethyl-phthalane with a pharmaceutically acceptable acid.

23. Acid oxalate of 1-(3-dimethylaminopropyl)-3,3-dimethyl-phthalane.

References Cited
UNITED STATES PATENTS

| | | | |
|---|---|---|---|
| 3,101,349 | 8/1963 | Pappo et al. | 260—345.2 |
| 3,103,519 | 9/1963 | Zaugg et al. | 260—345.2 XR |
| 3,226,402 | 12/1965 | Schoetensack et al. | 260—346.2 |

HENRY R. JILES, Primary Examiner

JOHN M. FORD, Assistant Examiner

U.S. Cl. X.R.

260—243, 247.1, 247.2, 247.7, 268, 293.4, 294, 294.7, 326.3, 326.5, 332.2, 332.3, 343.3, 345.2, 345.5, 515, 517, 570.5, 590, 591, 599, 618, 621, 999; 424—285

UNITED STATES PATENT OFFICE

CERTIFICATE OF CORRECTION

Patent No. 3,467,675    May 26, 1970

Povl Viggo Petersen, et al.

It is hereby certified that errors appear in the aobve-identified patent and that said Letters Patent are hereby corrected as shown below:

Column 5, line 51
Appl. Page 10, line 18    "p-toly-3,3-" should read
    --- p-tolyl-3,3- ---

Column 12, line 53
Appl. Page 25, line 29    "centigared" should read
    --- centigrade ---

Column 13, line 64
Appl. Page 26, line 12    "centigrade /.01" should read
    --- centigrade /0.1 ---

Column 17, line 8
Appl. Page 35, Cl. 5
Formula

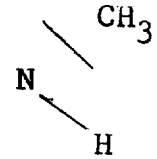

should be

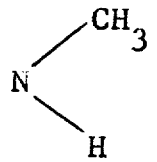

(SEAL)
Attest:

Edward M. Fletcher, Jr.
Attesting Officer

WILLIAM E. SCHUYLER, JR.
Commissioner of Patents